R. W. RYON.
COOKER.
APPLICATION FILED MAR. 18, 1913.

1,086,940.

Patented Feb. 10, 1914.
2 SHEETS—SHEET 1.

WITNESSES
E. W. Callaghan
L. A. Stanley

INVENTOR
Ross W. Ryon,
BY Munn & Co.
ATTORNEYS

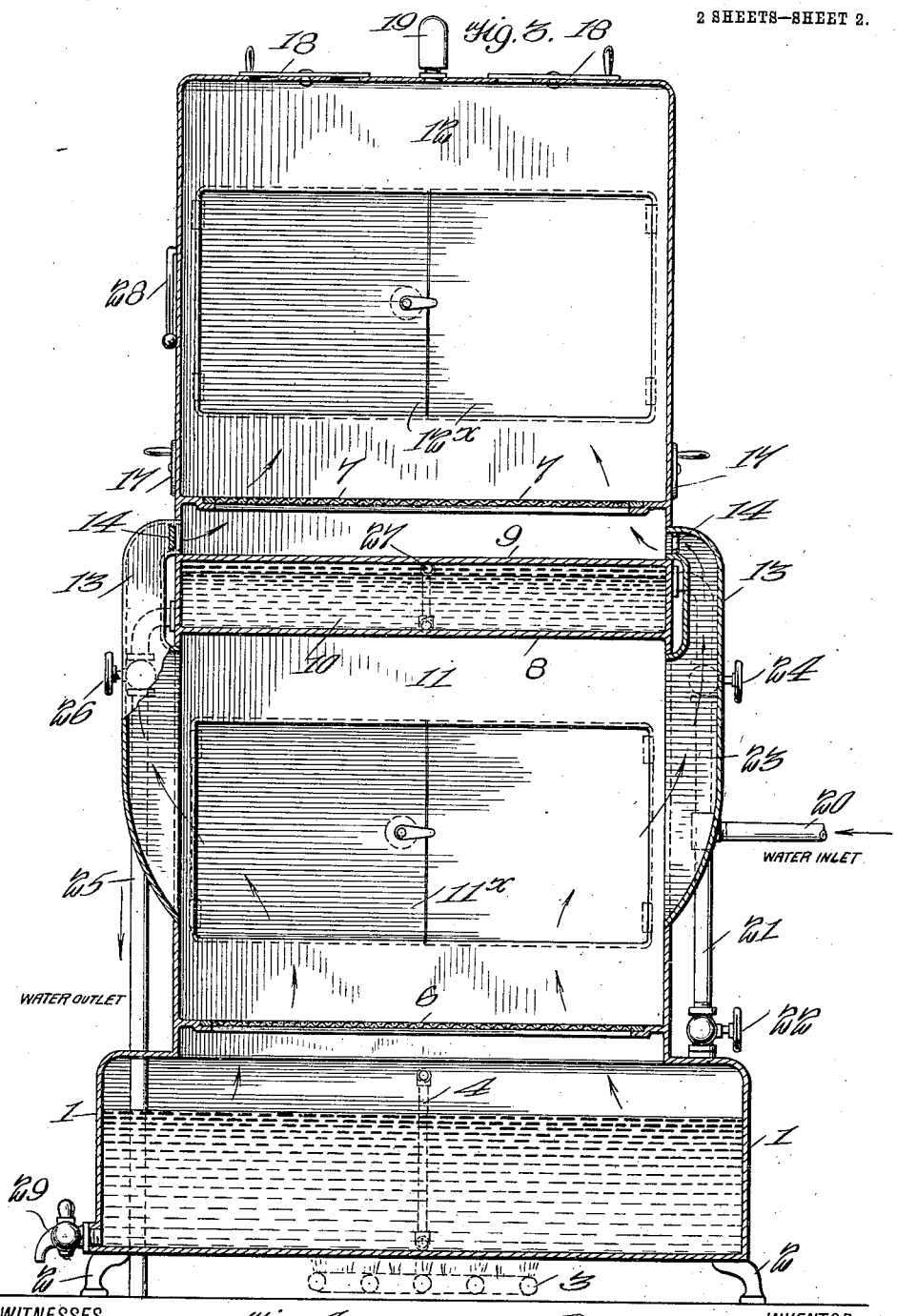

UNITED STATES PATENT OFFICE.

ROSS W. RYON, OF WASHINGTON, DISTRICT OF COLUMBIA.

COOKER.

1,086,940.        Specification of Letters Patent.        Patented Feb. 10, 1914.

Application filed March 18, 1913. Serial No. 755,245.

*To all whom it may concern:*

Be it known that I, ROSS W. RYON, a citizen of the United States, and a resident of Washington, in the District of Columbia, have made certain new and useful Improvements in Cookers, of which the following is a specification.

My invention relates to improvements in cooking devices, and it consists in the combinations, constructions and arrangements herein described and claimed.

An object of my invention is to provide a device in which the cooking of such articles as sausages may be conducted while at the same time the heating of other articles, such as rolls, may be accomplished with means for permitting the flavor or essence of the sausages to be absorbed by the rolls.

A further object of my invention is to provide a device comprising an upper and a lower oven and means for regulating the temperature and the amount of moisture in one of said ovens.

A further object of my invention is to provide a device having an oven which may be heated directly by steam or which may be cut off from the steam supply and be used as a dry oven.

Other objects and advantages will appear in the following specification and the novel features of the device will be particularly pointed out in the appended claims.

My invention is illustrated in the accompanying drawings forming part of this application in which similar reference letters indicate like parts in the several views and in which—

Figure 1:
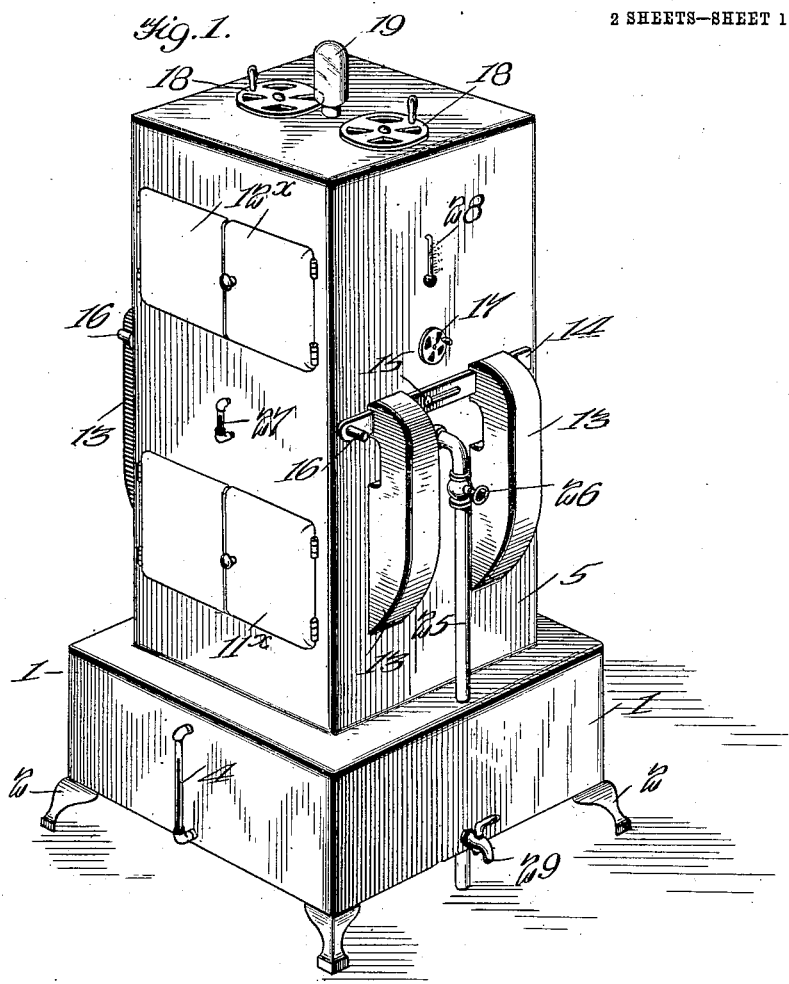
Figure 2:
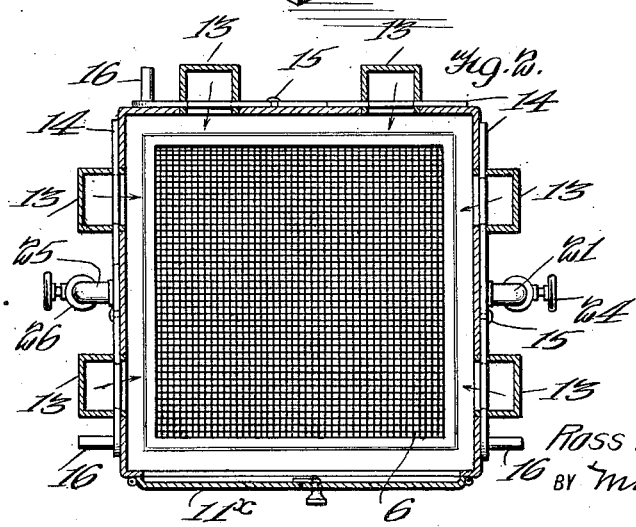

Figure 1 is a perspective view of the device, Fig. 2 is a horizontal section, Fig. 3 is a vertical section, and Fig. 4 is a perspective view of one of the dampers.

In carrying out my invention I provide a base portion 1 which constitutes a boiler. It may be supported on legs 2 and is preferably placed above a heating device such as the burners 3 of a gas heater. A water gage 4 is provided for indicating the height of the water in the reservoir or boiler.

Above the boiler, and forming an integral part thereof, is a casing 5 preferably of rectangular shape, as shown in the drawings, having a lower grate 6 and an upper grate 7. In the illustration these grates are shown as being composed of woven wire screen, but any suitable grates may be used without departing from the spirit of the invention. Disposed between the grates are the partitions 8 and 9. These partitions extend across the casing and the space between the partitions constitutes a water chamber 10. The space below the partition 8 constitutes a lower oven 11, while the space above the partition 9 constitutes an upper oven 12. Doors $11^x$ and $12^x$ are provided for the lower and upper ovens respectively.

As will be seen from the drawings I provide a series of conduits 13 extending from the lower oven and communicating with the bottom portion of the upper oven. These conduits as will be seen from Fig. 2 are preferably disposed on three sides of the device and are arranged in pairs. The conduits on the same side of the device are controlled by dampers 14 (see Fig. 4) provided with openings $14^x$ arranged to register with the conduits 13. The dampers 14 are each provided with a slot $14^y$ arranged to receive a guide pin 15 (see Fig. 3) and each damper has a handle 16 for operating the same. The movement of the damper will open or close the conduits on the same side of the device simultaneously.

The upper oven is provided on each side thereof with a damper or valve 17 for permitting the entrance of air from the outside, this damper being situated near the bottom of the upper chamber. The top of the device is provided with a pair of dampers or valves 18 and also with a safety valve 19.

In Fig. 3 I have shown the water inlet pipe 20. This communicates by means of the pipe 21 with the boiler or reservoir 1, a valve 22 being provided for controlling the water supply. The pipe 23 communicates with the chamber 10 and is provided with a valve 24. On the opposite side of the chamber 10 is a discharge pipe 25 which is provided with a valve 26. A gage glass 27 indicates the height of the water in the water chamber 10 while the thermometer 28 indicates the temperature of the upper oven or heating chamber 12. A drain cock 29 is provided for draining the water from the boiler.

From the foregoing description of the various parts of the device the operation thereof may be readily understood.

The valve 22 is turned so as to admit water to the boiler 1, the valve being shut when the water is approximately at the height indicated in Fig. 3. This may be determined by the gage 4. Articles such as sausages may be placed in the lower oven 11 on the grate 6 and the boiling of the water in the tank 1 will cause the steam to pass up into the oven and cook the sausages. It often happens that in restaurants and lunch rooms it is desirable to have warm rolls served with the sausages in the form of sandwiches. These rolls may be placed in the upper oven 12 on the grate 7. The dampers 14 may be opened so as to permit the steam from the sausages to pass upwardly into the upper oven thus heating the rolls which at the same time absorb the essence and flavor of the sausage.

In order to prevent an excess of moisture in the upper oven the dampers 14 may be adjusted to regulate the supply of steam coming from the lower oven. In case the upper oven should become too hot, cold water from the water inlet may be passed into the water chamber 10 on one side of the device and out on the other. This supply may be regulated by the valves 24 and 26, so as to prevent an excess of heat in the upper oven, the temperature being ascertained by means of the thermometer 28. In order to further cool off the oven, if it is desirable the dampers 17 and 18 may be opened and the dampers 14 entirely closed. With a supply of cold water flowing through the water chamber 10 the lower part of the oven becomes rapidly cooled and this cold air is forced upwardly by the still colder air which comes in from the outside, the warm air escaping from the dampers 18.

It will be understood that the regulation of the temperature and moisture in the upper oven is a matter of experiment. Thus when sausages are disposed in the lower chamber or oven and rolls or buns in the upper oven the dampers 14, 17 and 18 as well as the stop valves 24 and 26 can be so placed as to maintain the temperature and humidity of the upper oven practically constant for any given article. It will thus be seen that the rolls can be prevented from becoming soggy and yet can be kept hot.

In some instances it is desirable to close the dampers 17 and 18 and to open the dampers 14. The stop valve 19 is provided to prevent accidents from an accumulation of steam pressure since the valve 19 will open at a predetermined pressure to let off the steam.

The oven 12 is also designed to be used as a dry oven. In order to accomplish this the conduits 13 are closed by means of the dampers 14 and the water in the chamber 10 is permitted to pass out by the pipe 25. The heat of the lower oven will now pass through the walls of the chamber 10 and thence to the oven 12. The latter may serve therefore as a dry warming oven or with certain articles it may serve as a dry cooking oven.

It is obvious that any suitable means for filling the boiler 1 or the water chamber 10 might be provided in lieu of the pipe shown without departing from the spirit of the invention.

I claim:

1. In a cooker, a boiler, means for heating the boiler, a lower oven disposed above said boiler and arranged to receive the steam from the boiler, an upper oven, means connecting the two ovens for passing the steam from the lower oven into the upper oven, means for cooling the upper oven, said means comprising a cold water chamber disposed between the upper and the lower oven, and means for regulating the flow of water into and out of said cold water chamber.

2. In a cooker, a boiler, an oven disposed immediately above said boiler and arranged to receive the steam from the boiler, a grate disposed in said lower oven, an upper oven, a plurality of conduits connecting said lower oven with said upper oven, valves carried by said conduits for regulating the passage of the steam, a damper carried by said upper oven near the lower part thereof, a damper at the upper end of said upper oven, a cold water chamber disposed between said lower and said upper oven, the top of said lower oven forming the bottom of said water chamber, and the bottom of said upper oven forming the top of said water chamber, and means for regulating the passage of cold water into and out of said water chamber.

ROSS W. RYON.

Witnesses:
L. A. STANLEY,
SOLON C. KEMON.

---

Copies of this patent may be obtained for five cents each, by addressing the "Commissioner of Patents, Washington, D. C."